(12) United States Patent
Stippler et al.

(10) Patent No.: US 8,584,665 B2
(45) Date of Patent: Nov. 19, 2013

(54) BREWERY PLANT AND METHOD

(75) Inventors: Kurt Stippler, Marzling (DE);
Klaus-Karl Wasmuht, Ellingen (DE)

(73) Assignee: Krones AG, Neutraubling (DE)

( * ) Notice: Subject to any disclaimer, the term of this patent is extended or adjusted under 35 U.S.C. 154(b) by 823 days.

(21) Appl. No.: 11/886,926

(22) PCT Filed: Mar. 22, 2006

(86) PCT No.: PCT/EP2006/002638
§ 371 (c)(1),
(2), (4) Date: Dec. 19, 2008

(87) PCT Pub. No.: WO2006/100062
PCT Pub. Date: Sep. 28, 2006

(65) Prior Publication Data
US 2009/0148556 A1    Jun. 11, 2009

(30) Foreign Application Priority Data
Mar. 23, 2005 (EP) .................................... 05006424

(51) Int. Cl.
*F24H 7/00* (2006.01)
*F24J 2/04* (2006.01)
*F25B 29/00* (2006.01)

(52) U.S. Cl.
USPC .......................... 126/640; 126/400; 165/48.2

(58) Field of Classification Search
USPC ........ 99/278, 276, 277, 277.1, 277.2; 426/11, 426/16, 29, 600, 520; 126/640, 714
See application file for complete search history.

(56) References Cited

U.S. PATENT DOCUMENTS

| | | | | |
|---|---|---|---|---|
| 3,535,116 A * | 10/1970 | Harsanyi | ......................... | 426/29 |
| 4,100,756 A * | 7/1978 | Albertson | .................... | 62/235.1 |
| 4,153,104 A * | 5/1979 | Ruder | .......................... | 165/48.2 |
| 4,204,410 A * | 5/1980 | Kunz | ............................. | 62/500 |
| 4,273,102 A * | 6/1981 | Anthony | ....................... | 126/591 |
| 4,286,066 A | 8/1981 | Butler et al. | | |
| 4,326,502 A * | 4/1982 | Radenkovic | .................. | 126/685 |
| 4,373,574 A * | 2/1983 | Schafer | ........................ | 165/236 |
| 4,378,908 A * | 4/1983 | Wood | ............................ | 237/2 B |

(Continued)

FOREIGN PATENT DOCUMENTS

| | | |
|---|---|---|
| DE | 4242881 | 10/1993 |
| DE | 4304975 C1 | 3/1994 |

(Continued)

OTHER PUBLICATIONS

Brandon, et al., "Assessing New Energy Systems in Brewing. I.", Brewing & Distilling International, vol. 10, No. 5, p. 42, 1980.

(Continued)

*Primary Examiner* — Gene Kim
*Assistant Examiner* — John E Simms, Jr.
(74) *Attorney, Agent, or Firm* — Marshall, Gerstein & Borun LLP

(57) ABSTRACT

A brewery plant with at least one mash container, a lauter tun, a wort pan and a water housing, wherein at least part of the thermal energy requirement of the brewery is covered with solar collectors, and the solar collectors directly or indirectly heat a fluid. Also, a brewing method where the thermal energy requirement for at least of a part of the brewing process stages is at least partially covered with a fluid heated directly or indirectly by solar collectors.

35 Claims, 6 Drawing Sheets

(56) References Cited

U.S. PATENT DOCUMENTS

| | | | |
|---|---|---|---|
| 4,388,916 A * | 6/1983 | Murdock | 126/610 |
| 4,432,339 A * | 2/1984 | Hebert | 126/367.1 |
| 4,438,758 A * | 3/1984 | Brekke | 126/590 |
| 4,455,374 A | 6/1984 | Schwartz | |
| 5,012,727 A * | 5/1991 | Pesente | 99/470 |
| 5,103,802 A * | 4/1992 | Thomason | 126/610 |
| 5,762,991 A * | 6/1998 | Dziondziak et al. | 426/11 |
| 6,017,568 A * | 1/2000 | Visscher et al. | 426/16 |
| 6,169,852 B1 * | 1/2001 | Liao et al. | 392/395 |
| 6,484,506 B1 * | 11/2002 | Bellac et al. | 60/772 |
| 6,536,677 B2 * | 3/2003 | Melendez-Gonzalez et al. | 237/2 B |
| 6,871,579 B2 * | 3/2005 | Belkin et al. | 99/276 |
| 7,051,529 B2 * | 5/2006 | Murphy et al. | 60/641.8 |
| 7,296,410 B2 * | 11/2007 | Litwin | 60/641.12 |
| 7,299,633 B2 * | 11/2007 | Murphy et al. | 60/641.8 |
| 2002/0053214 A1 * | 5/2002 | Melendez-Gonzalez et al. | 62/235.1 |
| 2002/0153004 A1 * | 10/2002 | Agata | 126/637 |
| 2003/0121515 A1 * | 7/2003 | Yu-Chu et al. | 126/635 |
| 2003/0221438 A1 * | 12/2003 | Rane et al. | 62/271 |
| 2004/0031392 A1 * | 2/2004 | Belkin et al. | 99/275 |
| 2004/0187860 A1 * | 9/2004 | Rong | 126/573 |
| 2005/0126170 A1 * | 6/2005 | Litwin | 60/641.8 |
| 2005/0155347 A1 * | 7/2005 | Lewellin | 60/508 |
| 2005/0161520 A1 * | 7/2005 | Gast | 237/12 |
| 2006/0225729 A1 * | 10/2006 | Litwin | 126/573 |
| 2008/0092875 A1 * | 4/2008 | Leifer et al. | 126/617 |
| 2011/0033585 A1 * | 2/2011 | Wasmuht et al. | 426/231 |
| 2011/0139148 A1 * | 6/2011 | Milder et al. | 126/643 |
| 2011/0146959 A1 * | 6/2011 | Root | 165/108 |

FOREIGN PATENT DOCUMENTS

| | | |
|---|---|---|
| DE | 9404428.7 | 9/1994 |
| DE | 19710803 A1 | 9/1998 |
| DE | 19953493 A1 | 5/2001 |
| GB | 1520276 A | 8/1978 |
| RU | 2179690 | 2/2002 |
| WO | WO-00/27992 | 5/2000 |

OTHER PUBLICATIONS

Brandon, et al., "Assessment of Energy Conservation/New Energy Systems in the Brewing Industry", Technical Quarterly, Master Brewers' Association of the Americas Technapac, Inc., vol. 17, No. 1, p. 24, 1980.

Dieng, et al., "Literature Review on Solar Adsorption Technologies for Ice-Making and Air-Conditioning Purposes and Recent Developments in Solar Technology", Renewable and Sustainable Energy Reviews, Elseviers Science, vol. 5, No. 4, pp. 313-342, Dec. 2001.

Latmiral, "Energy Problems and the Brewing Industry", Birra E. Matto Birra Peroni, vol. 24, Nov. 11, 1979.

Murray, "Solar Pasteurization of Beer: A Pilot Application", Technical Quarterly, Master Brewers' Association of the Americas Technapac Co., vol. 16, No. 1, p. 13, 1979.

Perl, et al., "Nutzung Solarer Prozesswarme in Brauereien", Forum Der Brauerei, vol. 36, No. 10, p. 305, 1983.

Benz et al., "Solare Prozβwärmeerzeugung in der Lebensmittelindustrie" (Apr. 1999).

"Im heiz-tipp.de-Lexikon wurde gefunden: Schichtenspeicher", downloaded from the Internet at <http:www.heiz-tipp.de/lexikon-614schictenspeicher.html> (Oct. 7, 2010).

Kunze, Low pressure boiling with an energy saver, In: *Technology Brewing and Malting*, 2$^{nd}$ ed., VLB Berlin, pp. 274-275 (1999).

Fellner, "Der thermohydraulische Schichtspeicher" (Aug. 2001).

Pensel et al., "Die vollständige Wärmeversorgung des Sudhauses durch Abwärme einer Gasmotorenanlage," Brauweit, pp. 1630-1635 (1991).

\* cited by examiner

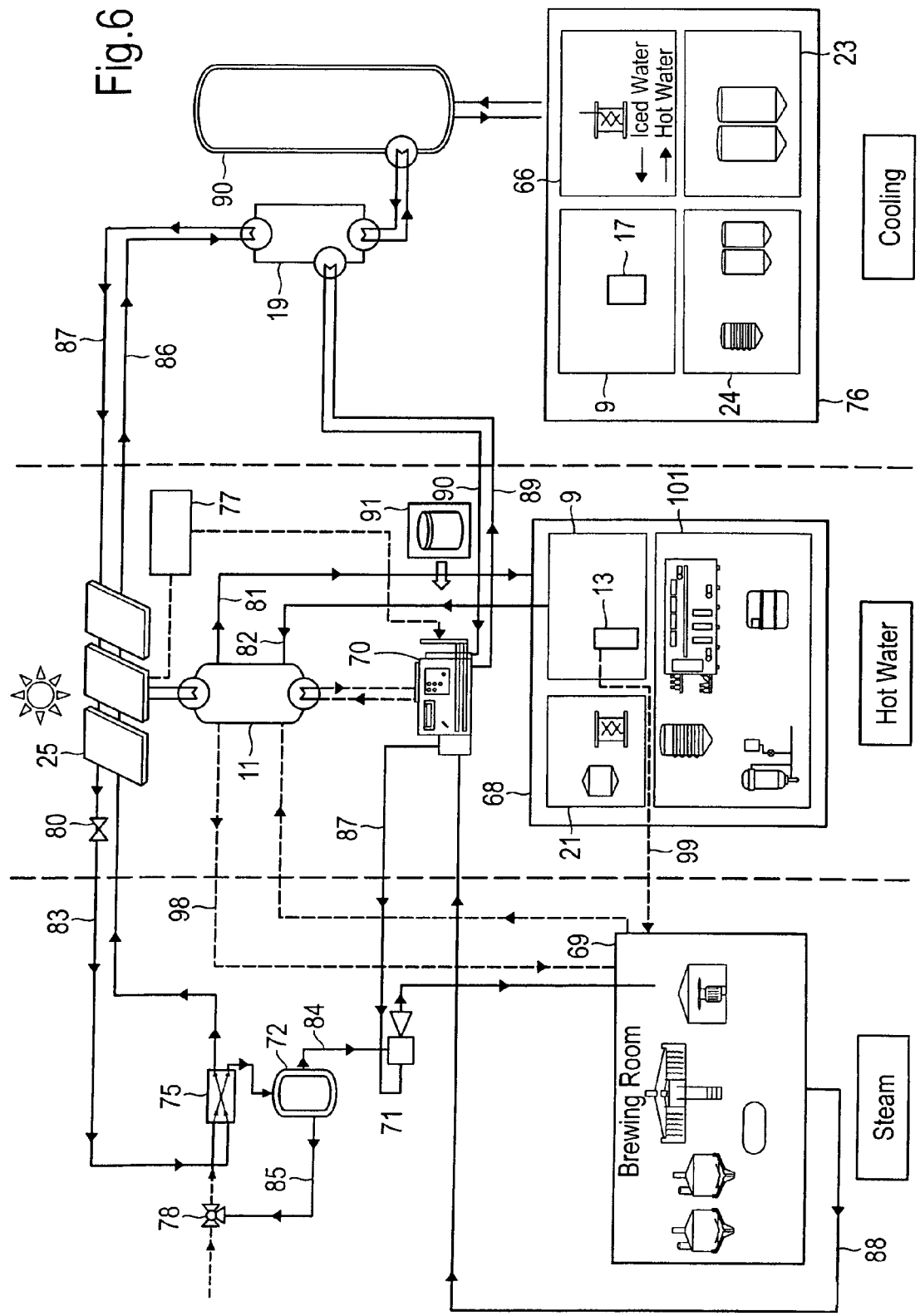

BREWERY PLANT AND METHOD

CROSS-REFERENCE TO RELATED APPLICATION

The present application claims the benefit of priority of International Patent Application No. PCT/EP2006/002638 filed on Mar. 22, 2006, which application claims priority of European Patent Application No. 05006424.5 filed Mar. 23, 2005. The entire text of the priority application is incorporated herein by reference in its entirety.

FIELD OF THE DISCLOSURE

The disclosure relates to a brewery plant with at least one mash container, a lauter tun, a wort pan and a water housing, and to a brewing method, all utilizing solar power for thermal energy.

BACKGROUND

Brewing beer is a process which requires a great deal of energy, wherein both electrical energy and thermal energy are required. Taken overall the energy costs represent a considerable share of the total production costs of beer. As a trend it must be assumed that the share of the energy costs will increase further due to the shortage of fossil fuels and the higher energy prices associated with it.

In order to reduce the influence of the energy costs on the production costs attempts have been made in conventional brewery plants to improve the energy recovery and the overall efficiency of the plant. For example, the feed-water is preheated through the cooling of flue gases in an economizer or heated steam is used which, in comparison to normal steam, is more transportable and thus fewer losses arise. In order to render the energy production more economical, cogenerating stations are being increasingly employed, which are used both for producing the electrical power and for the hot water or steam generation. Since they are however similarly based on fossil fuels, they are also not independent of price increases due to the shortage of fossil fuels.

SUMMARY OF THE DISCLOSURE

Therefore, the object of the present disclosure is to provide a brewery plant and a brewing method to render the breweries more independent of the requirement for fossil fuels.

With the aid of solar collectors, which convert the energy of the solar radiation into thermal energy, it is possible to cover at least part of the thermal energy requirement of the brewery plant with the aid of energy which does not originate from fossil fuels. In this respect, it is decisive for use in a brewery that the solar collectors are designed such that the hottest fluid required for the brewing process can be heated by solar energy up to a temperature of at least 120° C., in particular to a temperature of 160° C. to 180° C. The heating of the fluid is thus not restricted to producing warm water of approximately 50° C. to 60° C. as is otherwise usual when using solar collectors in the brewing industry.

Depending on the requirement of the brewery plant, the heating of the fluid can furthermore occur directly through the solar collectors, i.e. the fluid flows through the solar collectors where it is heated, or indirectly, i.e. a second fluid is heated in the solar collector and thermal energy is passed through a heat exchanger to the fluid used in the brewing process.

Preferably, the thermal energy generated in the solar collectors can be temporarily stored in a heat accumulator and, controlled by a control unit, fed to the thermal energy loads, in particular to the mash container, lauter tun, wort pan, water housing, CIP (cleaning in process) plant and/or bottle room, in particular for bottle cleaning. Thus, the thermal energy can be obtained through the solar collectors irrespective of the running of the brewing process and passed under control as required to the individual thermal energy loads in the brewery plant. The open-loop or closed-loop control here relates to the temperature of the fluid and/or the volume flow, wherein the amount of thermal energy fed is given by these parameters.

According to a preferred embodiment, to provide cooling the brewery can have a sorptive refrigerating plant, the thermal energy requirement of which is at least partially covered by the thermal energy produced by the solar collectors. Conventionally in breweries compression refrigeration systems are used, which however have the same disadvantages as conventional heat generators. In contrast the use of a sorptive refrigerating plant has the advantage that the thermal energy generated by the solar collectors can also be used for producing the required cooling.

Preferably the fluid, water, can be used under increased pressure (high-pressure water). By increasing the boiling temperature the required high temperatures of at least 120° C., in particular temperatures in a range from 160° C. to 180° C., can be achieved with the high-pressure water in the liquid phase.

In a preferred embodiment the solar collectors can have parabolic trough collectors. Relatively high temperatures can be achieved, in particular temperatures of up to 400° C. through focusing the solar radiation with the aid of a parabolic mirror onto the pipes in which the fluid flows which is to be heated. Thus, heating up to 120° C., in particular to up to 160° C. to 180° C. can be realized for the fluid used in the brewing method, even in latitudes which have less sunshine in comparison to southern countries.

With indirect heating of the fluid in the solar collectors, a heat transfer oil, molten salt or vapor can be preferably used for taking up the thermal energy. With these substances high efficiency levels (better than 14%) can be achieved.

The disclosure also relates to a brewing method where the thermal energy requirement of at least part of the brewing process stages, in particular during mashing, lautering and/or wort boiling, is at least partially covered by a fluid which is directly or indirectly heated by solar collectors to a temperature of at least 120° C., in particular to a temperature in a range from 160° C. to 180° C. Through the use of thermal energy from solar radiation the dependence on conventional thermal energy generators can be reduced. In order to make the method more efficient than in the conventional generation of energy it is particularly important that the fluid can be heated to the highest temperatures which are used in the process. In this respect the fluid can be heated both directly as well as indirectly.

According to a preferred embodiment the thermal energy requirement for bottle cleaning can at least be partially covered by a fluid heated directly or indirectly by solar collectors to a temperature of at least 120° C., in particular to a temperature in a range from 160° C. to 180° C. The advantageous use of solar energy is thus not just restricted to the actual brewing process, but rather it can be used in the whole beer production. In particular, in the bottle room the energy requirement during bottle cleaning is high, so that the use of solar energy is advantageous.

Preferably the thermal energy requirement of a sorptive refrigerating plant for the production of iced water for the brewing method can at least be partially covered by a fluid heated directly or indirectly by solar collectors to a temperature of at least 120° C., in particular to a temperature in a range from 160° C. to 180° C. The advantageous use of solar energy is thus not just restricted to the actual thermal energy requirement in the brewing process, but rather it can be also used in the production of the iced water required in the process in order to reduce the dependence on conventional energy sources.

According to a preferred embodiment the brewery plant additionally comprises a high-speed steam generating device which feeds thermal energy to the fluid that is to be heated by the solar collectors.

This embodiment has the advantage that if the power from the solar collectors is not sufficient, for example due to reduced solar radiation resulting from poor weather or due to the time of day, a high-speed steam generating device can be switched in. Thus, it is ensured that sufficient thermal energy can be fed to the individual thermal loads even with reduced solar radiation. A high-speed steam generating device is characterized in that it can quickly generate vapor, in particular steam, to compensate a power deficit from the solar collectors. The high-speed steam generating device is in particular advantageous, because it can be operated, for example, by regenerative energy sources via a district heating power station, rendering the plant overall independent of non-regenerative energy sources, in particular fossil fuels.

Furthermore, the plant can comprise a device which determines whether the power of the solar collectors is sufficient to cover the energy requirement of thermal loads to which thermal energy is fed via the fluid, in particular to heat the fluid to a temperature of at least 120° C., in particular 160° C. to 180° C., and which initiates the switching in of the high-speed steam generating device when the power from the solar collectors is not sufficient.

Thus the heated fluid can be controlled reliably to a certain temperature, even when variations occur in the solar radiation.

Here, preferably the power of the high-speed steam generating device is closed-loop controlled in relationship to the power from the solar collectors, that is of course also in dependence of the solar radiation.

Preferably, the fluid heated by the solar collectors is stored in a heat accumulator, in particular in a high-pressure tank. The use of the high-pressure tank enables water at a temperature >100° to be stored due to elevation of the boiling point. Advantageously, the high-pressure tank is a stratified storage tank, in which hot water for hot-water loads can be drawn off in the upper region and to which the cooler water can be fed back in a circuit for heating up again.

Preferably, the high-speed steam generating device heats the fluid in the heat accumulator tank, in particular in the high-pressure tank, if it is switched in. To determine whether the high-speed steam generating device is to be switched in or not, the temperature, for example, in the energy storage tank, which in the end also depends on the power of the solar collectors, can also be used.

According to a preferred embodiment, part of the fluid heated by the solar collectors is passed as steam to thermal loads, which need steam as the heating medium, wherein another part of the heated fluid which is stored in the high-pressure tank is passed to thermal loads which need hot water, whereas a further part of the fluid heated by the solar collectors is passed to an absorption refrigeration plant, which supplies refrigerant (such as for example, NH3 and water, glycol, iced water, etc.) to refrigeration loads.

This concept enables steam thermal loads, hot-water thermal loads and simultaneously refrigeration loads (through the use of an absorption refrigeration plant) to be used via the fluid which is heated to a temperature of over 120°. This overall concept, in particular in combination with the high-speed steam generating device facilitates an ideal supply of the individual loads with energy in a simple manner.

If required the amount of heat fed can be increased as required for all sections, i.e. for the steam section, hot-water section and refrigeration section.

Preferably, the high-speed steam generator, which is switched in, then produces steam for the thermal loads which need steam or produces steam through the high-speed steam generating device which is passed on to the absorption refrigeration plant.

Preferably, the high-speed steam generating device is followed by a steam jet compressor so that the steam, for example, can be used for the thermal loads in the brewing room, etc.

The fluid heated by the solar collectors and which is passed to the thermal loads which need steam as the heating medium, is here fed to a relaxation tank and a steam jet compressor.

According to the disclosure a high-speed steam generator can be provided for the thermal loads with a heating medium of steam, hot water and cooling for switching in. The high-speed steam generating device can however also comprise several appropriate high-speed steam generators.

BRIEF DESCRIPTION OF THE DRAWINGS

An embodiment of the disclosure is illustrated in the drawing and is explained below in detail.

An embodiment of the disclosure is illustrated in the drawing and is explained below in detail. The following are shown:

FIG. 6 schematic of an overall concept for a brewery plant according to the present disclosure.

DETAILED DESCRIPTION OF THE DISCLOSURE

Figure 1:
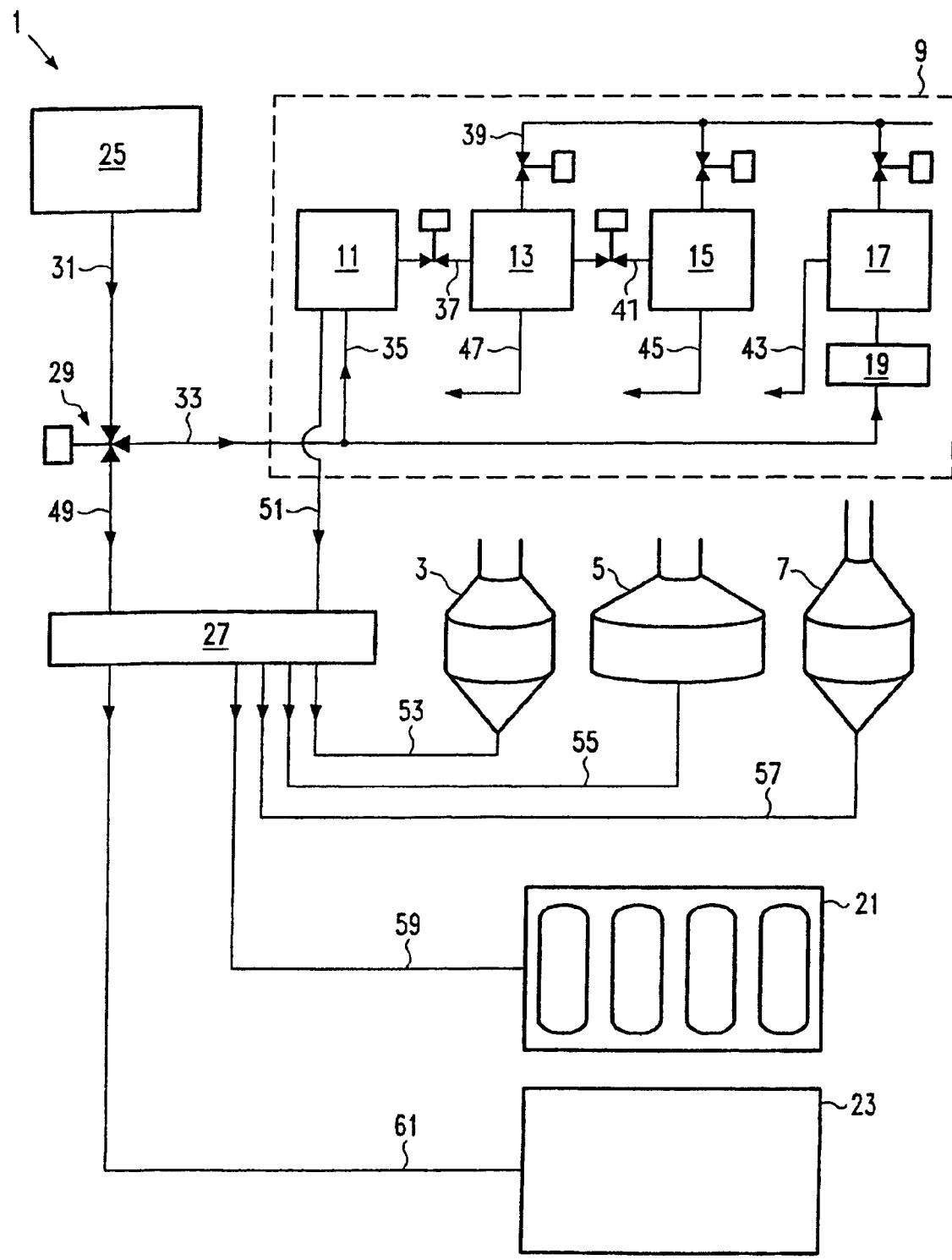
FIG. 1 schematic of a brewery plant according to a preferred embodiment of the disclosure.

FIG. 1 shows a brewery plant 1 with a mash container 3, lauter tun 5, wort pan 7 and a water housing 9. The water housing 9 comprises several heat accumulators: a high-pressure hot-water tank 11, suitable for fluid temperatures of at least 120° C., in particular from 160° C. to 180° C., a warm-water tank 13, a cold-water tank 15 and an iced-water tank 17. A sorptive refrigerating plant 19 is used to produce the iced water. In addition the brewery plant 1 also has a CIP (Cleaning In Process) system 21. This system is used for the cleaning and disinfection of the brewery plant 1. Furthermore, a bottle room 23 is schematically illustrated. Here the bottling equipment and the bottle cleaning equipment for the brewery are located. Finally, the solar collectors 25 are illustrated in FIG. 1. They are used to cover at least part of the thermal energy requirement of the brewery 1. The solar collectors 25 are designed such that a fluid is directly or indirectly heated with the aid of the solar collectors 25 to at least 120° C., in particular up to 160° C. to 180° C.

In the direct method the fluid is heated by the solar radiation directly in the solar collector 25, whereas in the indirect method a second fluid is heated which transfers its energy via a heat exchanger (not illustrated) to the first fluid which is used further in the brewing process.

Parabolic trough collectors have been found to be particularly advantageous for use in a brewery. With these solar collectors 25 the sunlight is focused by a parabolic mirror onto a pipe in which the fluid circulates which is to be heated up. In the indirect embodiment a heat transfer oil, molten salt or steam can be used, for example, wherein temperatures of up to 400° are achieved. With the direct method water under high pressure is suitable to achieve the desired temperatures of at least 120° C., in particular from 160° C. to 180° C., in the liquid phase.

The brewery plant 1 also has an open-loop and closed-loop control unit 27 which is used to pass on under open or closed-loop control the heated fluid to the various thermal energy loads. In this regard the plant 1 is designed such that the control unit 27 draws the heated fluid flow either directly from the solar collectors 25 or via the high-pressure hot-water tank 11. A selector valve 29, for example, is used to select between the two flows.

In the brewery plant 1 illustrated in FIG. 1 only the elements are illustrated which have a high thermal energy requirement. Other elements such as fermentation, storage and filter rooms, etc. have been omitted in the illustration.

The functioning principle of the heat energy supply of the brewery plant 1 according to the disclosure will now be described in detail. The fluid directly or indirectly heated by the solar collectors 25 with a temperature of at least 120° C., in particular from 160° C. to 180° C., flows via the pipes 31, 33 and 35 into the high-pressure hot-water tank 11. Here the thermal energy produced by the solar collectors 25 can be temporarily stored and called upon as required. If the thermal energy requirement is not completely covered by the solar collectors 25, then the lacking amount of heat can be generated by conventional methods and fed to the storage tank.

The hot-water storage tank 11 is connected to the warm-water storage tank 13 via the pipe 37. Thus, the required warm water normally at approximately 80° C. can be produced by mixing cold water from the cold-water feed 39 with the high-pressure hot water 37. Similarly, the water in the cold-water storage tank 15 can be brought to the desired temperature of usually 15° C. via the pipe 41 and the cold-water feed 39. Furthermore, in the water housing 9 the refrigerant, typically at a temperature of 2° C., is prepared in the iced-water storage tank 17. To achieve this, according to the disclosure a sorptive refrigerating plant 19 is used, which receives the thermal energy it needs either from the high-pressure hot-water tank 11 or directly from the solar collectors 25. From the various water storage tanks the pipes 43, 45 and 47 are routed via the control unit 27 to the respective loads.

Depending of the setting of the selector valve 29, the heated fluid is passed either directly via the pipe 49 or from the high-pressure hot-water tank 11 via the pipe 51 to the open and closed-loop control unit 27. The open and closed-loop control unit 27 then distributes the thermal energy stored in the high-pressure hot water as required to the thermal energy loads of the brewery plant 1. If necessary, through mixing with water from the other storage tanks 13, 15 and 17, the required amount of thermal energy can be individually fed to each element of the brewery plant 1 using the volume flow and/or the fluid temperature.

Thus, the mash container 3 is supplied with the required thermal energy via the feed pipe 53, the lauter tun 5 via the feed pipe 55 and the wort pan 7 via the feed pipe 57. Similarly, the CIP system 21 is supplied with thermal energy via the pipe 59. The bottle room 23, in particular with the bottle cleaning equipment (not illustrated), is supplied via the pipe 61. The necessary fluid return lines are not shown in FIG. 1 for the sake of clarity.

Of course, also other elements, such as for example the building heating, can be supplied with thermal energy as required from the solar collectors 25. Furthermore, it is conceivable that instead of or in addition to the high-pressure hot water a steam generator is used to supply at least part of the brewery plant 1 with thermal energy using steam, in particular steam at high pressures. Furthermore, it is conceivable that in addition to heating up a fluid for the supply of thermal energy also photovoltaic elements could be used for supplying electrical power to the brewery plant 1.

The solar system 25 is in this case advantageously mounted on the roof of the brewery plant 1 or on its walls, because then no additional area for the solar system 25 of the brewery plant 1 is needed.

Figure 2:
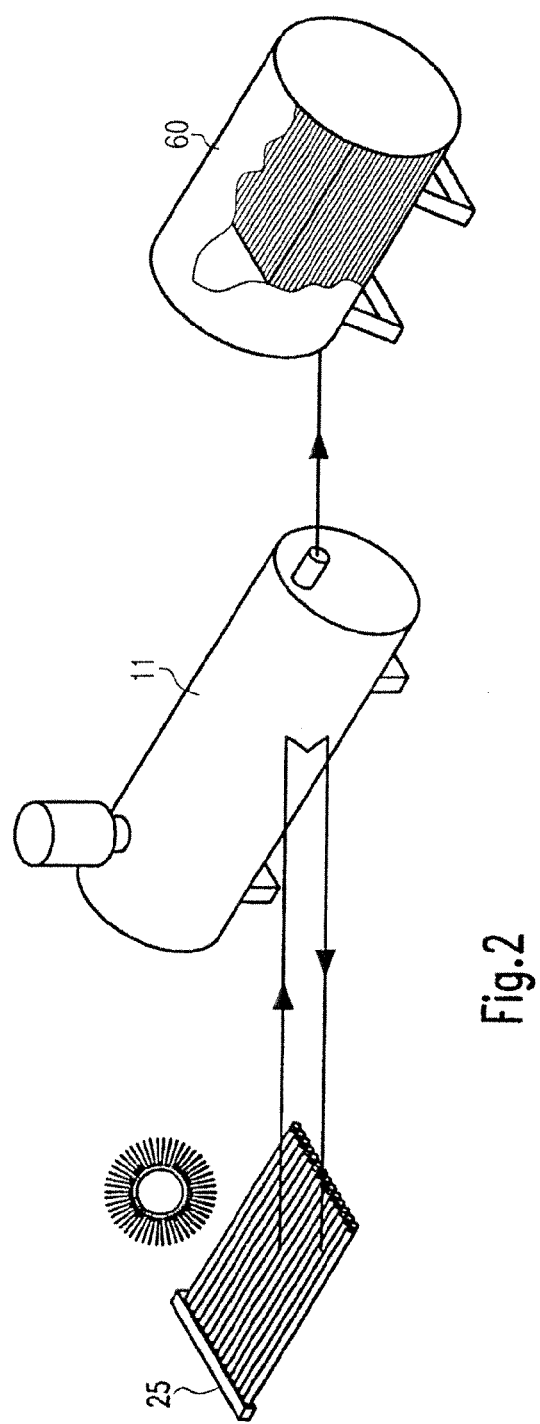
FIG. 2 schematic of a combination of solar collectors, a high-pressure tank and a steam boiler.

FIG. 2 illustrates a possible embodiment of the present invention, wherein the fluid heated by the solar collectors 25, i.e., the high-pressure hot water is first passed into the heat accumulator, i.e., into the high-pressure hot-water tank 11, wherein the water circulates in a circuit, so that the high-pressure hot water in the tank 11 can be maintained at a temperature >100° C., for example, 110° C. to 120° C. From the high-pressure hot-water tank 11 the high-pressure hot water can then be passed to a steam boiler 60 located in the plant, whereupon the steam can be fed to thermal loads, which need steam as the heat medium, such as for example the brewing room.

Figure 3:
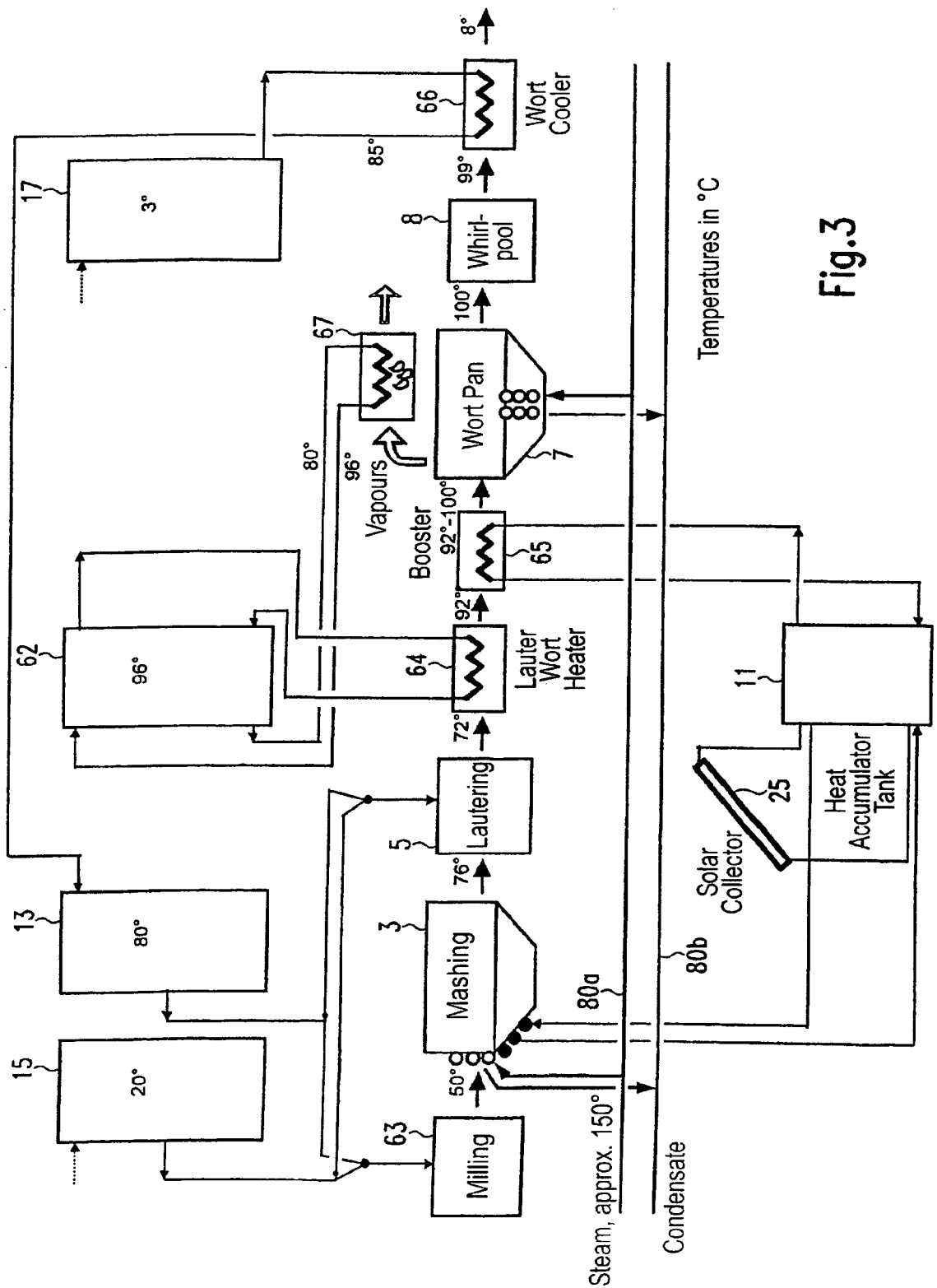
FIG. 3 schematic of a brewery plant with solar thermal decoupled heat supply according to the disclosure.

FIG. 3 illustrates a concept in which an existing brewery plant has a heat supply decoupled by solar thermal means. FIG. 3 illustrates main devices for the beer production, which need water at the most varied temperatures, such as for example the malt mill 63, which requires cold water and warm water from the corresponding cold and warm-water storage tanks. Furthermore, the main constituent parts of the brewing room are illustrated with a mash container 3, lauter tun 5, lauter wort heater 64, temperature booster 65, wort pan 7 and a whirlpool 8, which mainly need steam and/or high-pressure hot water as the heat medium. As a refrigeration load, the whirlpool arranged after the wort cooler 66 requires refrigerant from the iced-water storage tank 17. As can be seen from FIG. 3, the decoupled heat supply has solar collectors 25, wherein, as already described, high-pressure hot water is stored in the heat accumulator 11. Here, as an additional tank to the hot-water storage tank 62, which for example supplies the lauter wort heater 64 with thermal energy, the heat accumulator is provided for the high-pressure hot water heated by the solar collectors 25. The high-pressure hot water, which is stored in the heat accumulator 11, supplies, for example, the booster 65 with thermal energy, which heats the wort further to 100° C. An evaporation condenser is illustrated with 67. Furthermore, the mash container 3 is supplied with thermal energy in the form of steam and/or high-pressure hot water via the heat accumulator 11.

FIG. 3 also illustrates the conventional steam pipe 80a and the condensate pipe 80b, which pass thermal energy to the mash container 3 and the wort pan 7. The supply of heat by the solar collectors 25 is, as is shown in FIG. 3, decoupled from the conventional supply of heat by steam and hot water.

Figure 4:
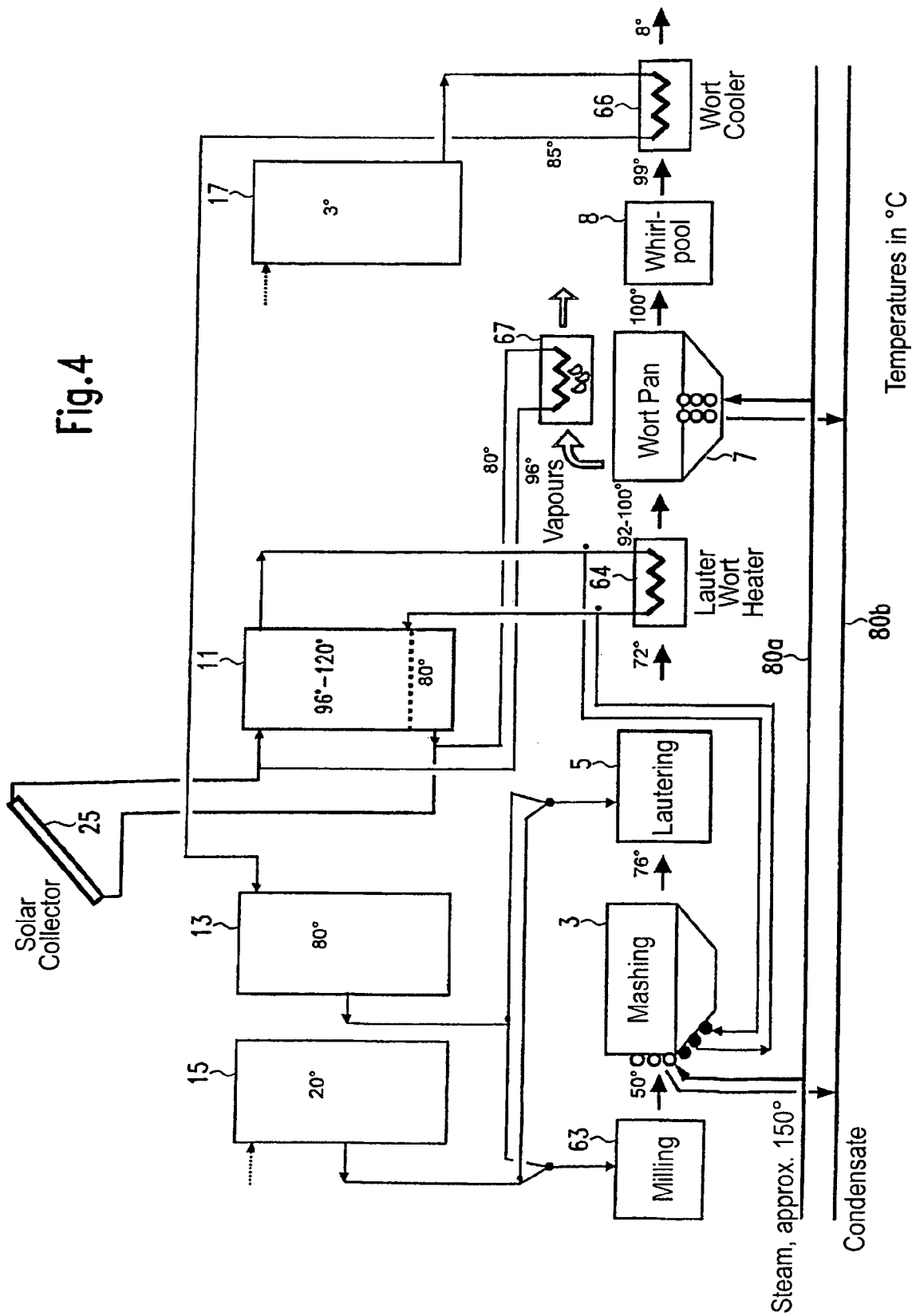
FIG. 4 schematic of a brewery plant with a solar thermal integrated heat supply.

In contrast FIG. 4 illustrates an example in which the solar thermal supply of heat is integrated. Here, the heat accumulator 11, for example a stratified storage tank, takes over the function of the conventionally employed hot-water storage tank 62. This means that here for example the hot water, which is fed to the lauter wort heater 64, is used directly from the heat accumulator 11, i.e. from the high-pressure hot-water tank. The high-pressure hot water needed for the lauter wort heater 64 is taken from the high-pressure hot-water tank 11, which is a stratified storage tank, in the upper region, fed to the lauter wort heater 64 and returned to the lower region of the stratified storage tank 11. For the evaporation condenser 67 colder water is taken from the high-pressure hot-water tank 11, heated and passed back to the upper region of the storage tank 11. An arrangement of this nature substantially simplifies the construction of a brewery plant, because a heat accumulator tank can be omitted.

Figure 5:
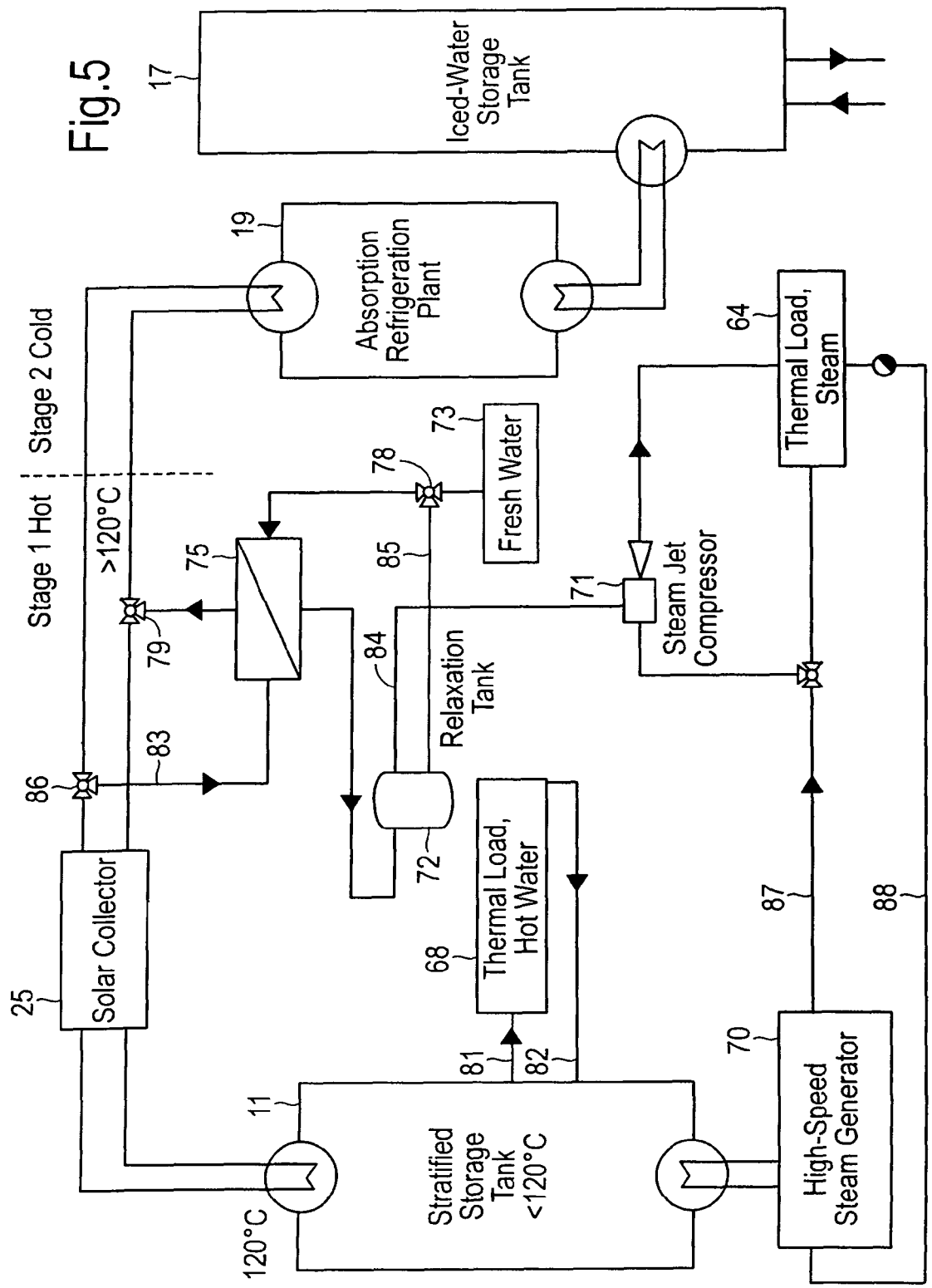
FIG. 5 schematic of an overall concept for a brewery plant according to the present disclosure.

FIGS. 5 and 6 illustrate an overall concept for a brewery plant with thermal loads 69 which need steam as well as thermal loads 68 which need hot water and for refrigeration loads 76. The thermal loads which need steam include, for example, the individual constituent parts in the brewing room, such as the wort pan 7 and mash container 3.

Apart from the brewing room, the thermal loads which require hot water as the heating medium include, for example, the equipment 101 for bottle cleaning, keg cleaning, the filter room, and the CIP system 21 as well as some hot-water loads in the brewing room, such as for example the mash container, lauter wort heater, etc. Also in the water housing 9 the warm-water storage tank 13 needs hot water.

The refrigeration loads, which need for example iced water as the refrigerant, include for example the iced-water tank 17, the wort cooling system 66, the yeast, fermentation and storage rooms 24 and the filter and pressurized tank rooms 23.

The brewery plant illustrated in FIGS. 5 and 6 have solar collectors 25, in particular vacuum pipe solar collectors, which supply high-pressure hot water at a temperature of at least 120° C., in particular at a temperature of 160° C. to 180° C. The solar collectors 25 produce high-pressure hot water both for the thermal loads 69, which need steam as the heating medium as well as for the thermal loads 68, which need hot water and for the absorption refrigeration plant 19, which supplies iced water for the refrigeration loads 76. Thus, all sections are covered by the solar collectors 25. For the supply of hot water the solar collectors 25 are connected to a high-pressure hot-water tank 11 such that the high-pressure hot water, which has been directly or indirectly heated by the solar collectors 25, circulates between the solar collectors and the high-pressure hot-water tank. The high-pressure hot water in the high-pressure hot-water tank 11, which here is a stratified storage tank, has a temperature, which, as can be seen in FIG. 5, for example reduces from 120° C. down to a temperature of <120° C. High-pressure hot water can then be passed via a pipe 81 from the upper region of the high-pressure hot-water tank to the thermal loads 68, which need hot water. The hot water which has cooled down is returned to the high-pressure hot-water tank 11 in a lower region via the pipe 82. Instead of steam as a heating medium also high-pressure hot water can be fed directly in the circuit from the high-pressure hot-water tank 11 to loads in the brewing room via the pipe 98. It is also possible to feed water from the hot-water tank 13 to loads in the brewing room via the pipe 99.

To supply the thermal loads 69, which need steam as the heating medium, the high-pressure hot water is fed via a pipe 83 to a heat exchanger 75, which then passes the high-pressure water to a relaxation tank 72. In the relaxation tank 72 the water heated by the solar collectors is present in the liquid and also steam phases. The steam is drawn from the relaxation tank via the pipe 84 in the upper region and passed to a steam jet compressor 71, whereupon it is passed on to the thermal loads 69. Condensate can, for example, pass into a collection container via the pipe 88 to the high-speed steam generator. In the lower region of the relaxation tank 72 a pipe 85 branches off, which leads to a three-way valve 78, wherein via the three-way valve 78 either fresh water or water from the relaxation tank 72 can be fed via the heat exchanger 75 to the solar collectors 25.

For the supply of the absorption refrigeration plant 19 with thermal energy high-pressure hot water is fed from the solar collectors 25 via a pipe 86 to the absorption refrigeration plant 19, which converts heat for cooling in the known manner. Also here the fluid or water heated by the solar collectors circulates in the circuit and returns to the solar collectors 25 via the pipe 87. The cooled water is stored in a refrigeration accumulator, for example a refrigeration stratified storage tank 90, and passed as iced water to the iced-water tank 17 and the refrigeration loads 76.

The plant also includes a device 77, which determines whether the power from the solar collectors 25 is sufficient to adequately heat the fluid or water and to adequately supply the heat required to the thermal and refrigeration loads 69, 68, 76, which are supplied with thermal energy by the solar collectors. The device 77, which can be integrated into a system controller, can here for example compare the temperature in the high-pressure hot-water tank 11 with a certain set-point temperature, wherein then when the temperature in the high-pressure hot-water tank 11 lies below a certain limit temperature, a signal is passed to the high-speed steam generating device 70, which is then switched in. It is however possible, alternatively or additionally, to measure the power of the solar radiation incident on the solar collectors 25, or to measure the temperature of the directly or indirectly heated fluid and, as previously explained, to compare it with a corresponding set-point temperature. Thus, variations in the solar radiation can be compensated, wherein a uniform and constant supply of the individual thermal loads with thermal energy is facilitated. If therefore the device 77 detects that an additional thermal energy requirement is present, then the high-speed steam generating device generates steam which is for example introduced into the lower region of the high-pressure hot-water accumulator and circulates back to increase the temperature in the high-pressure hot-water tank 11 to an adequate extent until the temperature in the high-pressure hot-water accumulator 11 again lies in a certain set-point range, which is determined by appropriate sensors which are not illustrated.

The high-speed steam generating device 70 does not just feed thermal energy to the hot water as required, but rather also supplies the thermal loads 69, which need steam as the heating medium, with additional thermal energy, in that steam is fed via the pipe 87 to the steam jet compressor 71 and then to the thermal loads 69. Cooled condensate is returned via the pipe 88 in a circulating manner to the high-speed steam generating device 70. Thus, the required lacking amount of heat is fed as required, i.e. with reduced solar radiation or increased heat consumption.

Also, as exclusively illustrated in FIG. 6, additional thermal energy in the form of steam can be fed via the high-speed steam generating device 70 via the pipe 89 to the absorption refrigeration plant and condensate can be returned via the pipe 90 to the high-speed steam generating device 70, so that sufficient heat can be converted to cooling.

The power of the high-speed steam generating device 70 is controlled in dependence of the power from the solar collectors 25 and in relationship to the consumption of the corresponding thermal and refrigeration loads 69, 68, 76. In FIGS.

5 and 6 only one high-speed steam generating device 70 is illustrated which supplies both the thermal loads 69, 68 and the re-frigeration loads 76. It is however also possible that several appropriate high-speed steam generators 70, which are separately controlled by the device 77, are provided.

The high-speed steam generating device according to the disclosure has fast operational readiness with a reduced heating up period. This is particularly important, because the high-speed steam generator is employed here as a standby or peak-load steam generator. The operating principle of a high-speed steam generator is based on the water-pipe principle, wherein water which is passed through is heated in one pass and vaporized. Due to the water-pipe construction without a defined steam space, the water content is relatively low. Water is quickly turned into steam. Thus, there are no standstill losses such as occur for example with flame and smoke-tube boilers. The high-speed steam generator can have an integrated burner, which can in turn be operated using alternative fuels 91. The high-speed steam generator can produce 80 to 2000 kg of steam per hour.

The high-speed steam generating device 70 is advantageously operated by burning regenerative energy sources, such as for example rapeseed oil, biogas, etc. For example the high-speed steam generating device can also be operated by a biomass cogenerating station to remain independent of conventional energy sources.

Due to the fact that the fluid or water is heated to high temperatures over 120° C., which can in particular be realized advantageously with vacuum pipe solar collectors 25, it is possible to supply simultaneously different thermal loads 69, 68, 76, 19 with appropriate thermal energy and to also take into account power variations via a high-speed steam generating device.

The above embodiments have been described in conjunction with water as the fluid, but they are not restricted to water.

The invention claimed is:

1. Brewery plant comprising at least one mash container (3), a lauter tun (5), a wort pan (7) and a water housing (9), and wherein at least part of the thermal energy requirement of the brewery is covered by solar collectors (25), the solar collectors directly or indirectly heating a fluid to a temperature of at least 120° C., wherein the thermal energy generated in the solar collectors (25) is buffer stored in a high pressure tank and supplied, controlled by a control unit (27), to thermal energy consumers, wherein the high pressure tank is a stratified store, a first pipe (81) is provided which passes high pressure hot fluid from the upper region of the high pressure tank to the thermal energy loads, and a second pipe (82) is provided between the thermal energy consumers and a lower region of the same high pressure storage tank that returns cooled down fluid to the high pressure storage tank from the thermal energy consumers, wherein the lower region of the tank is below the upper region.

2. Brewery plant according to claim 1, and a refrigeration supply comprising a sorptive refrigerating plant (19), the thermal energy requirement for which refrigeration supply is covered at least partly by the thermal energy produced by the solar collectors (25).

3. Brewery plant according to claim 1, wherein the fluid is water under increased pressure.

4. Brewery plant according to claim 1, wherein the solar collectors (25) have parabolic trough collectors.

5. Brewery plant according to claim 1, wherein with the indirect heating of the fluid in the solar collectors (25) a heat transfer oil, molten salt or steam is used for absorbing the thermal energy.

6. Brewing method, comprising that the thermal energy requirement of at least part of the brewing process stages, in particular during mashing, lautering and/or wort boiling, is at least partially covered by a fluid which is directly or indirectly heated by solar collectors (25) to a temperature of at least 120° C., in particular to a temperature in a range from 160° C. to 180° C., wherein thermal energy generated in the solar collectors (25) is buffer stored in a high pressure tank and supplied, controlled by control unit (27), to the thermal energy consumers, wherein a stratified store is used as a high pressure tank, and wherein high pressure hot fluid is passed from the upper region of the high pressure tank to the thermal energy loads and the fluid is returned to a lower region of the same high pressure tank which is below said upper region from the thermal energy consumers via a pipe (82).

7. Brewing method according to claim 6, wherein the thermal energy requirement during bottle cleaning is covered at least partially by a fluid which is directly or indirectly heated by solar collectors (25) to a temperature of at least 120° C.

8. Brewing method according to claim 6 and a sorptive refrigerating plant, wherein the thermal energy requirement of the sorptive refrigerating plant (19) during the production of iced water is covered at least partially by a fluid which is directly or indirectly heated by solar collectors (25) to a temperature of at least 120° C.

9. Brewery plant according to claim 1, wherein the brewery plant also has a high-speed steam generating device (70), which can be switched in as required and which feeds additional thermal energy to the fluid to be heated by the solar collectors (25).

10. Brewery plant according to claim 9, wherein the plant comprises a device (77) which determines whether the power of the solar collectors (25) is sufficient to cover the energy requirement of thermal loads to which thermal energy is fed via the fluid, and which initiates the switching in of the high-speed steam generating device (70) when the power from the solar collectors (25) is not sufficient.

11. Brewery plant according to claim 9, wherein the power of the high-speed steam generating device (70) can be adapted to the power of the solar collectors (25).

12. Brewery plant according to the claim 9, wherein at least part of the fluid heated by the solar collectors (25) is stored in a high-pressure tank (11).

13. Brewery plant according to claim 12, wherein the high-pressure tank (11) is a stratified storage tank.

14. Brewery plant according to claim 12, wherein the high-speed steam generating device (70) heats fluid in the high-pressure tank (11).

15. Brewery plant according to claim 9, wherein part of the fluid heated by the solar collectors (25) is passed as steam to the thermal loads (69) which need steam as the heating medium,
   part of the fluid heated by the solar collectors which is stored in an energy accumulator tank (11) is passed to thermal loads (68) which need hot water, and
   part of the water heated by the solar collectors is passed to an absorption refrigeration plant (19) which supplies refrigerant to refrigeration loads (76).

16. Brewery plant according to claim 9 wherein the high-speed steam generating device (70) can be switched in and generates steam as required for the thermal loads (69) which need steam.

17. Brewery plant according to claim 16, and wherein a steam jet compressor (71) follows the high-speed steam generating device (70).

18. Brewery plant according to claim 16, wherein the switched in high-speed steam generating device (70) passes thermal energy as required to an absorption refrigeration plant (19).

19. Brewery plant according to claim 15, wherein the fluid heated for the thermal loads (69), which need steam as the heating medium, is passed to a relaxation tank (72), from where the steam phase is fed to a steam jet compressor (71), before it is passed to the thermal loads (69).

20. Brewery plant according to claim 9, wherein the high-speed steam generating device (70) can be operated through a district heating power station using regenerative energy sources.

21. Brewery plant according to claim 1, wherein the water housing (9) comprises a warm-water storage tank (13), a cold-water storage tank (15), an iced-water storage tank (17) and a hot-water storage tank (11, 62), wherein the fluid heated by the solar collectors (25) is stored in a separate heat accumulator.

22. Brewery plant according to claim 21, wherein the heat accumulator, is used as hot-water storage tank for the fluid heated by the solar collectors (25).

23. Brewery plant according to claim 9, wherein the high-speed steam generating device (70) comprises several high-speed steam generators.

24. Brewing method according to claim 6 to, wherein the additional thermal energy is fed as required to the fluid heated by the solar collectors (25) by a high-speed steam generating device (70) which can be switched in.

25. Method according to claim 24, and determining whether the power of the solar collectors (25) is sufficient to cover the energy requirement of thermal loads to which thermal energy is fed via the fluid, and switching in the high-speed steam generating device (70) when the power from the solar collectors (25) is determined as not sufficient.

26. Method according to claim 24, wherein at least part of the fluid heated by the solar collectors (25) is stored in a heat accumulator tank.

27. Brewing method according to claim 24, wherein part of the fluid heated by the solar collectors (25) is passed as steam to the thermal loads (69) which need steam as the heating medium,
part of the fluid heated by the solar collectors which is stored in a heat accumulator tank is passed to thermal loads (68) which need hot water, and
part of the fluid heated by the solar collectors (25) is passed to an absorption refrigeration plant (19) which supplies refrigerant to refrigeration loads (76).

28. Brewing method according to claim 27, wherein the switched-in high-speed steam generating device (70) supplies steam for the thermal loads (69) which need steam.

29. Brewing method according to claim 27, wherein the switched-in high-speed steam generating device (70) supplies thermal energy to the absorption refrigeration plant (17).

30. Brewery plant according to claim 27, wherein the switched-in high-speed steam generating device (70) heats water in a high-pressure tank (11).

31. Brewery plant according to claim 1, wherein the brewery plant also comprises a steam generating device, which can increase as required the amount of heat fed for a steam section, hot-water section and refrigeration section.

32. Brewery plant according to claim 1, wherein solar collectors directly or indirectly heat the fluid to a temperature of 160° C. to 180° C.

33. Brewery plant according to claim 1, wherein the thermal energy consumers include one or more of the following: the mash container (3), the lauter tun (5), the wort pan (7), the water housing (9), a CIP plant (21), and a bottle cellar (23) for cleaning bottles.

34. Brewery method according to claim 6, wherein solar collectors directly or indirectly heat the fluid to a temperature in a range from 160° C. to 180° C.

35. Brewery method according to claim 6, wherein the thermal energy is supplied to thermal energy consumers including one or more of the following: the mash container (3), the lauter tun (5), the wort pan (7), the water housing (9), a CIP plant (21), and a bottle cellar (23) for cleaning bottles.

\* \* \* \* \*

UNITED STATES PATENT AND TRADEMARK OFFICE
CERTIFICATE OF CORRECTION

PATENT NO.        : 8,584,665 B2                                                      Page 1 of 1
APPLICATION NO.   : 11/886926
DATED             : November 19, 2013
INVENTOR(S)       : Stippler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1352 days.

Signed and Sealed this
Twenty-second Day of September, 2015

Michelle K. Lee
*Director of the United States Patent and Trademark Office*